Oct. 31, 1939.  L. S. WILLIAMS  2,178,155
INDICATING DEVICE
Filed Oct. 7, 1937  3 Sheets-Sheet 1
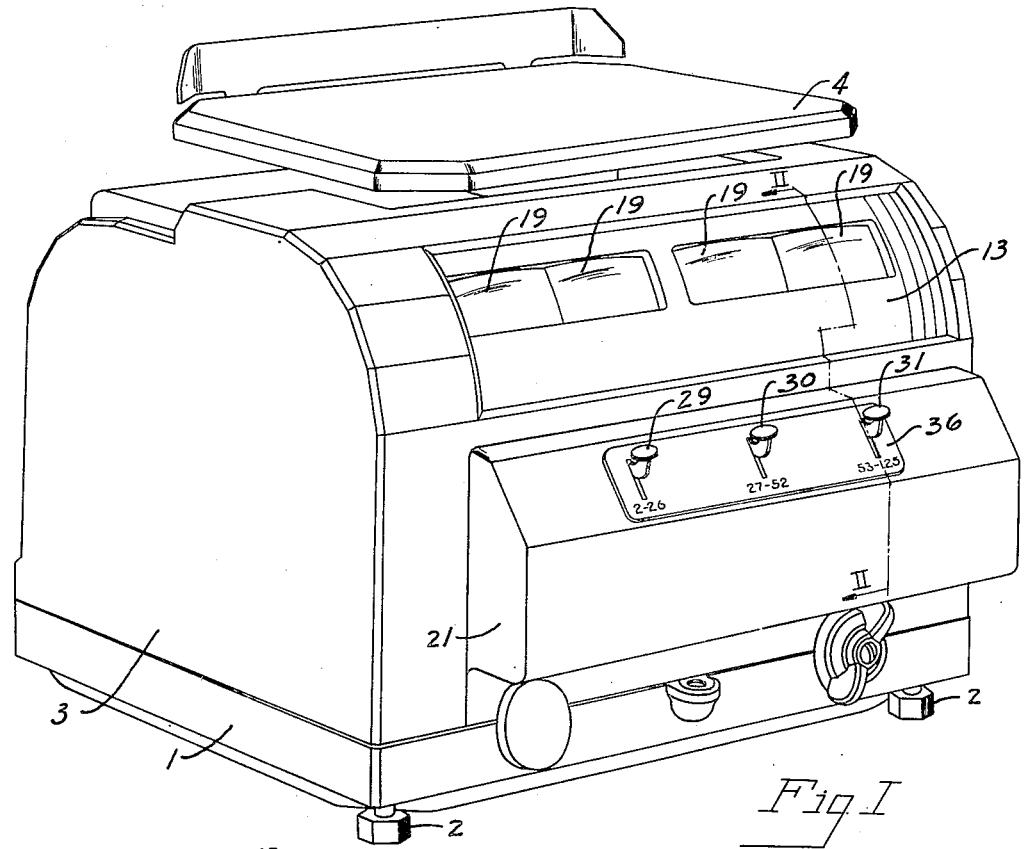
Fig. I
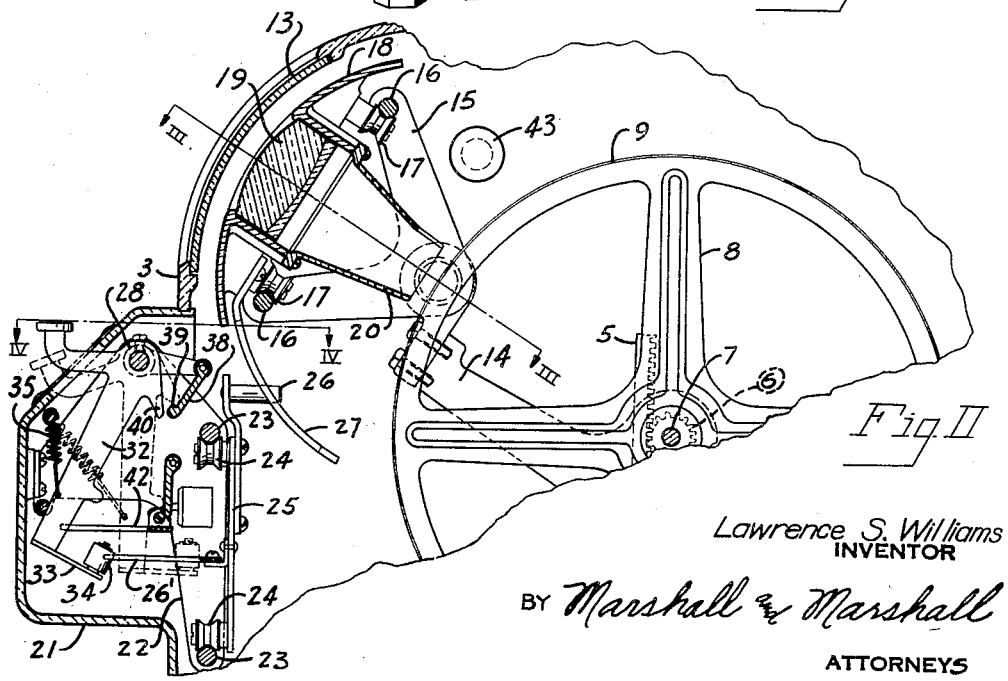
Fig. II
Lawrence S. Williams
INVENTOR
BY Marshall & Marshall
ATTORNEYS

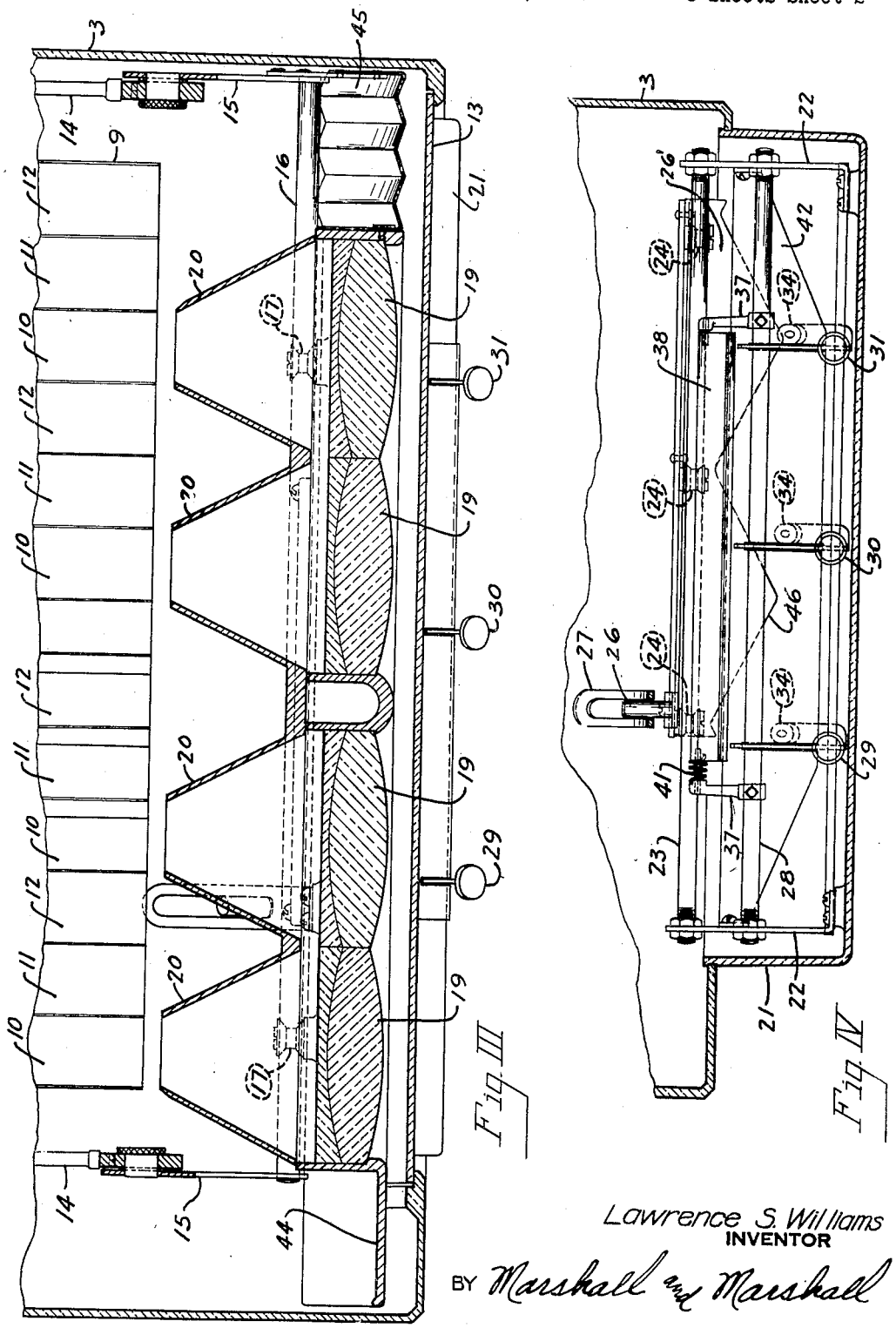

Oct. 31, 1939.   L. S. WILLIAMS   2,178,155
INDICATING DEVICE
Filed Oct. 7, 1937   3 Sheets—Sheet 3
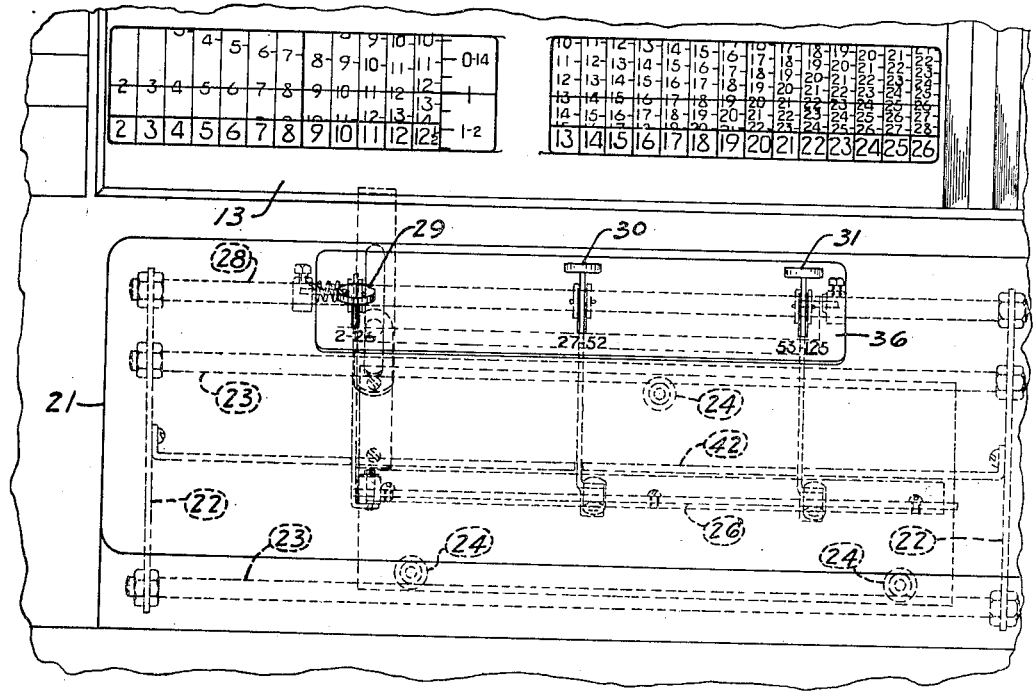
Fig. V
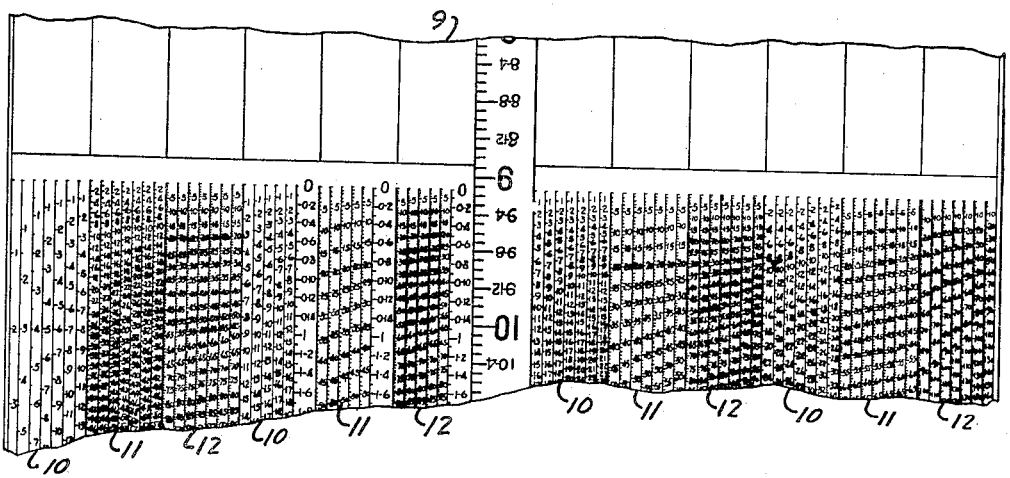
Fig. VI
Lawrence S. Williams
INVENTOR
BY Marshall & Marshall
ATTORNEYS Patented Oct. 31, 1939

2,178,155

UNITED STATES PATENT OFFICE

2,178,155

INDICATING DEVICE

Lawrence S. Williams, Toledo, Ohio, assignor to Toledo Scale Manufacturing Company, Toledo, Ohio, a corporation of New Jersey Application October 7, 1937, Serial No. 167,737

4 Claims. (Cl. 88—1)

This invention relates to indicating devices, and its principal object is to provide a magnifying indicating device of the type originally illustrated and described in United States Patent No. 1,973,-685, issued September 11, 1934, to Charles O. Marshall, with improved manipulating mechanism.

Another object is to provide magnifying indicating mechanism of the type illustrated and described in the above mentioned patent, and having means by which it may be shifted selectively into any of three indicating positions without the exercise of care or skill.

Still another object is to provide magnifying indicating means of the type described in the above mentioned patent with key-operated mechanism for shifting the magnifying indicating means from any of three positions into any other of such three positions.

An ancillary object is the provision of improved means for hiding the end portions of the chart when the magnifying means is shifted away from in front of such end portions.

Other objects and advantages will be apparent from the following description, in which reference is had to the accompanying drawings illustrating a preferred embodiment of my invention and wherein similar reference numerals designate similar parts throughout the several views.

In the drawings:

Figure I is a view in perspective of a weighing scale embodying my invention;

Figure II is a fragmentary sectional elevational view taken substantially on the line II—II of Figure I;

Figure III is a fragmentary sectional view taken substantially on the line III—III of Figure II;

Figure IV is a fragmentary sectional plan view taken substantially on the line IV—IV of Figure II;

Figure V is a fragmentary front elevational view showing the indicating device positioned to indicate computed values at low prices per pound; and Figure VI is a view showing a fragment of the chart employed in the device of my invention.

The invention is illustrated as incorporated in a scale of the form shown and described in United States Patent No. 2,066,624 issued January 5, 1937, to Halvor W. Hem, but it is to be understood that it may be incorporated in other forms of computing scales. Since the instant invention is concerned only with the indicating mechanism of the scale, the other features of the scale are illustrated only in such detail as will serve to show the connection of the instant invention therewith.

The scale illustrated has a base 1 supported upon leveling feet 2 and surrounded by a housing 3. Overlying the housing 3 is a platter 4 adapted to receive commodities to be weighed. When commodities are placed upon the platter 4, a rack 5 is moved endwise by levers and load-counterbalancing mechanism (not shown), thus turning a pinion 6 which is fixed upon a shaft 7. Also fixed upon the shaft 7 are spiders 8, about the peripheries of which is mounted a cylindrical chart 9 which preferably is made of a thin sheet of aluminum.

Upon the surface of the chart 9 are printed three sets of computed value indicia, each set consisting of four spaced blocks of columns. Indicia representing computations at the lowest prices per pound (e. g., 2¢ per pound to 26¢ per pound) are printed in the set 10, which includes the first, fourth, seventh and tenth blocks, counting from the left side of the chart, as shown in Figure VI. Computed values at intermediate prices per pound (e. g., 27¢ per pound to 52¢ per pound) are represented by indicia printed in the set 11, which includes the second, fifth, eighth and eleventh blocks, counting from the left side of the chart, while indicia printed in the set 12, which occupies the third, sixth, ninth and twelfth blocks, represent computed values at the highest prices per pound (e. g., 53¢ per pound to $1.25 per pound).

An elongated opening is formed in the front of the casing 3 and preferably is occupied by a curved glass window 13.

Supported upon brackets 14 which are fixed to the base 1 is a frame consisting of V-shaped end pieces 15 and parallel rods 16. Mounted upon the rods 16 by means of rollers 17 is a lens frame 18 carrying lenses 19 and lens cells 20. Each of the lenses 19 is of such magnifying power and is positioned at such a distance in front of the chart 9 that characters on the chart viewed through the lenses are magnified three diameters both vertically and horizontally. The lens cells 20 are frusto-pyramidal in shape, each lens cell being positioned directly back of a lens, as shown in Figure III, and having an opening in its forward end corresponding substantially to the area of the lens and an opening in its rear end adjacent the chart of substantially one-ninth the area of the lens. Hence, the portion of the chart viewed through each of the lenses and lens cells is one-third as high and one-third as wide as the face of the lens, but because both its height and its width are magnified three diameters, the portion of the chart viewed through the lens appears to be substantially co-extensive in area with the lens, and the interior of each lens cell as seen through its lens appears as a rectangular passage, the walls of which appear not to converge to any great extent but to be nearly parallel to each other rearwardly from each edge of the lens. Thus the adjacent sides of each two lens cells appear to merge into one thin wall extending directly to the rear.

When the lens frame is in the position in which it is shown in Figures III and V, the rear openings of the lens cells lie directly over the blocks of indicia representing values computed at the lowest prices per pound (i. e., 2¢ per pound to 26¢ per pound). The sets of indicia 11 and 12, representing computations at the intermediate and higher prices per pound, are in this position of the lens frame hidden from view behind the sides of the lens cells and, owing to the optical effect produced by the lenses and lens cells, the set 10 of indicia, representing computed values at the lowest prices per pound, appears to occupy the whole of the width of the chart 9 in the manner indicated in Figure V. If the lens frame be shifted the width of one block of columns of indicia to the right, computed values at intermediate prices per pound will be visible, and if the lens frame be shifted to its extreme right position, computed values at the highest prices per pound will be visible.

In order that the lens frame 18 may be instantly shifted to any selected position and stopped in exact registration with the proper blocks of columns without necessitating the exercise of care or skill on the part of the operator, I have provided key-operated lens frame shifting mechanism, which is located principally in a forwardly extending bay 21 built upon the housing 3.

Supported upon brackets 22, fixed to the wall of the bay 21, are a pair of rods 23, and mounted upon the rods 23 by means of anti-friction rollers 24 is a frame 25 which is provided with a finger 26 that extends into a slot cut in a depending member 27 secured to the lens frame 18. Fixed to the frame 25 and extending forwardly therefrom is a flange 26', the forward edge of which is of zigzag shape, as indicated at 46 in Figure IV.

Also secured to the brackets 22 is a transversely extending shaft 28 upon which are mounted for rocking movement three manipulative keys 29, 30 and 31. Extending downwardly from each manipulative key is a leg 32 having at its lower end a foot 33, upon the toe of which is mounted a roller 34. A retractile spring 35, connecting the leg 32 to the bay 21, tends to hold each key in elevated position.

When one of the keys 29, 30 or 31 is pressed downwardly, the roller 34 operated by that key is swung into engagement with the zigzag edge 46 of the flange 26' and moves to the bottom of one of the V-shaped notches formed by the zigzag edge of the flange, at the same time shifting the flange, the frame 25 and the lens frame 18 into position in which one of the sets of indicia representing computed values is rendered visible. The edge of the flange 26' is so formed that when the key 29 is pushed downwardly the lenses 19 are positioned in front of the set 10 of indicia, while if the key 30 be pressed the lenses and lens cells are positioned to make the set 11 of indicia visible, and if the key 31 be pressed the set 12 of indicia are rendered visible.

In order that a person unfamiliar with the device may know which key to press to enable any desired set of computations to be read, a plate 36 may be provided to cover the opening through which the keys project, and the plate may be marked with the low prices (2—26) adjacent the key 29 and the intermediate prices (27—52) adjacent the key 30 and the high prices (53—1.25) adjacent the key 31.

Fixed to the shaft 28 is a pair of rearwardly extending brackets 37 between which is mounted a pivoted pawl strip 38. The lower edge of the pawl strip is provided with a bead 39 which, when one of the manipulative keys is pressed downwardly, is engaged by a hook 40 preferably formed integral with the leg 32. When the bead 39 is engaged by one of the hooks 40, the pawl strip 38 is swung rearwardly against the tension of a spring 41 until the hook 40 rides over the bead 39, whereupon the pawl strip is swung forwardly by the spring 41 and the hook is caught behind the bead in the manner shown in dotted lines in Figure II. Each key thus is held in depressed position until another key is pressed downwardly, whereupon the previously depressed key is released and the subsequently depressed key is held in its depressed position.

In order to prevent the legs 32 from springing sidewise when the rollers 34 engage the zigzag edge 27 of the flange 26', they are guided in slots in a plate 42 which is fastened to the brackets 22.

The figures on the chart may be illuminated by a lamp 43.

In order to prevent the interior mechanism from being visible through the curved glass window 13, the lens frame is equipped at one end with a rigid shield 44 and at the other end with a collapsible shield 45. The shield 44 is used where there is room for it to slide into and the collapsible shield 45 is used where such room is lacking. The shield 45 preferably consists of a bellows-like structure having a series of relatively stiff leaves connected at their edges by a flexible covering.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a frame, a chart mounted on said frame, said chart bearing indicia in interdisposed blocks of columns, the indicia of one series of blocks of columns representing values computed at low prices, the indicia of another series of blocks of columns representing values computed at high prices and the indicia of still another series of blocks of columns representing prices computed at intermediate prices, a series of magnifying lenses mounted on said frame and positionable to render visible either the indicia of the series of blocks of columns representing values computed at low prices or the indicia of the series of blocks of columns representing values computed at high prices or the indicia of the series of blocks of columns representing values computed at intermediate prices, keys mounted on said frame and corresponding respectively to low price indicia, high price indicia and intermediate price indicia, and means connected to said series of magnifying lenses and operable upon manipulation of any of said keys to position said series of magnifying lenses to render visible the indicia of the series of blocks of columns to which the key manipulated corresponds.

2. In a device of the class described, in combination, a frame, a chart mounted on said frame, said chart bearing indicia in interdisposed blocks of columns, the indicia of one series of blocks of columns representing values computed at low prices, the indicia of another series of blocks of columns representing values computed at high prices and the indicia of still another series of blocks of columns representing prices computed at intermediate prices, a series of magnifying lenses mounted on said frame and positionable to render visible either the indicia of the series of blocks of columns representing values computed at low prices or the indicia of the series of blocks of columns representing values computed at high prices or the indicia of the series of columns representing values computed at intermediate prices, keys mounted on said frame and corresponding respectively to low price indicia, high price indicia and intermediate price indicia, means connected to said series of magnifying lenses and operable upon manipulation of any of said keys to position said series of magnifying lenses to render visible the indicia of the series of blocks of columns to which the key manipulated corresponds, said lens series positioning means including a member having a zigzag contour, and rollers connected to said keys and selectively engageable with the zigzag contour of said member.

3. In a device of the class described, in combination, a frame, a chart mounted on said frame, said chart bearing indicia in interdisposed blocks of columns, the indicia of one series of blocks of columns representing values computed at low prices, the indicia of another series of blocks of columns representing values computed at high prices, a series of magnifying lenses mounted on said frame and positionable to render visible either the indicia of the series of blocks of columns representing values computed at low prices or the indicia of the series of blocks of columns representing values computed at high prices, keys mounted on said frame and corresponding respectively to low price indicia and high price indicia, and means connected to said series of magnifying lenses and operable upon manipulation of any of said keys to position said series of magnifying lenses to render visible the indicia of the series of blocks of columns to which the key manipulated corresponds.

4. In a device of the class described, in combination, a frame, a chart mounted on said frame, said chart bearing indicia in interdisposed blocks of columns, the indicia of one series of blocks of columns representing values computed at low prices, the indicia of another series of blocks of columns representing values computed at high prices, a series of magnifying lenses mounted on said frame and positionable to render visible either the indicia of the series of blocks of columns representing values computed at low prices or the indicia of the series of blocks of columns representing values computed at high prices, keys mounted on said frame and corresponding respectively to low price indicia and high price indicia, means connected to said series of magnifying lenses and operable upon manipulation of any of said keys to position said series of magnifying lenses to render visible the indicia of the series of blocks of columns to which the key manipulated corresponds, said lens series positioning means including a member having a zigzag contour, and rollers connected to said keys and selectively engageable with the zigzag contour of said member.

LAWRENCE S. WILLIAMS.